United States Patent [19]
Schoenbachler et al.

[11] 3,962,885
[45] June 15, 1976

[54] AIR CONDITIONING SYSTEM FOR A MOBILE HOME

[75] Inventors: Bernard W. Schoenbachler; Bruce L. Ruark, both of Louisville, Ky.

[73] Assignee: General Electric Company, Louisville, Ky.

[22] Filed: Mar. 6, 1975

[21] Appl. No.: 555,798

[52] U.S. Cl. ............................ 62/239; 62/237; 62/259; 62/298; 62/448; 296/28 R
[51] Int. Cl.² ............................................. B60H 3/04
[58] Field of Search ............ 62/77, 237, 239, 259, 62/262, 298, 448, 449, 450; 248/249; 296/28 R

[56] References Cited
UNITED STATES PATENTS

| | | | |
|---|---|---|---|
| 2,525,869 | 10/1950 | Corhanidis | 62/129 |
| 2,914,927 | 12/1959 | Corhanidis | 62/237 |
| 3,206,943 | 9/1965 | Rice et al | 62/302 |
| 3,254,914 | 6/1966 | Steck | 296/28 R |
| 3,566,614 | 3/1971 | Imral | 62/262 |
| 3,712,078 | 1/1973 | Maynard et al | 62/448 |
| 3,792,895 | 2/1974 | Paulson | 296/28 R |

*Primary Examiner*—William E. Wayner
*Assistant Examiner*—Larry I. Schwartz
*Attorney, Agent, or Firm*—Frank P. Giacalone; Francis H. Boos

[57] ABSTRACT

The present invention provides an air conditioning system for a mobile home. The system includes securing a mounting means to the support structure of the mobile home and an air conditioning unit that is adapted to be removably secured to the mounting means. When installed on the mounting means, the air conditioning unit is aligned to deliver conditioned air into the interior of the mobile home through its built-in air distribution system.

4 Claims, 6 Drawing Figures

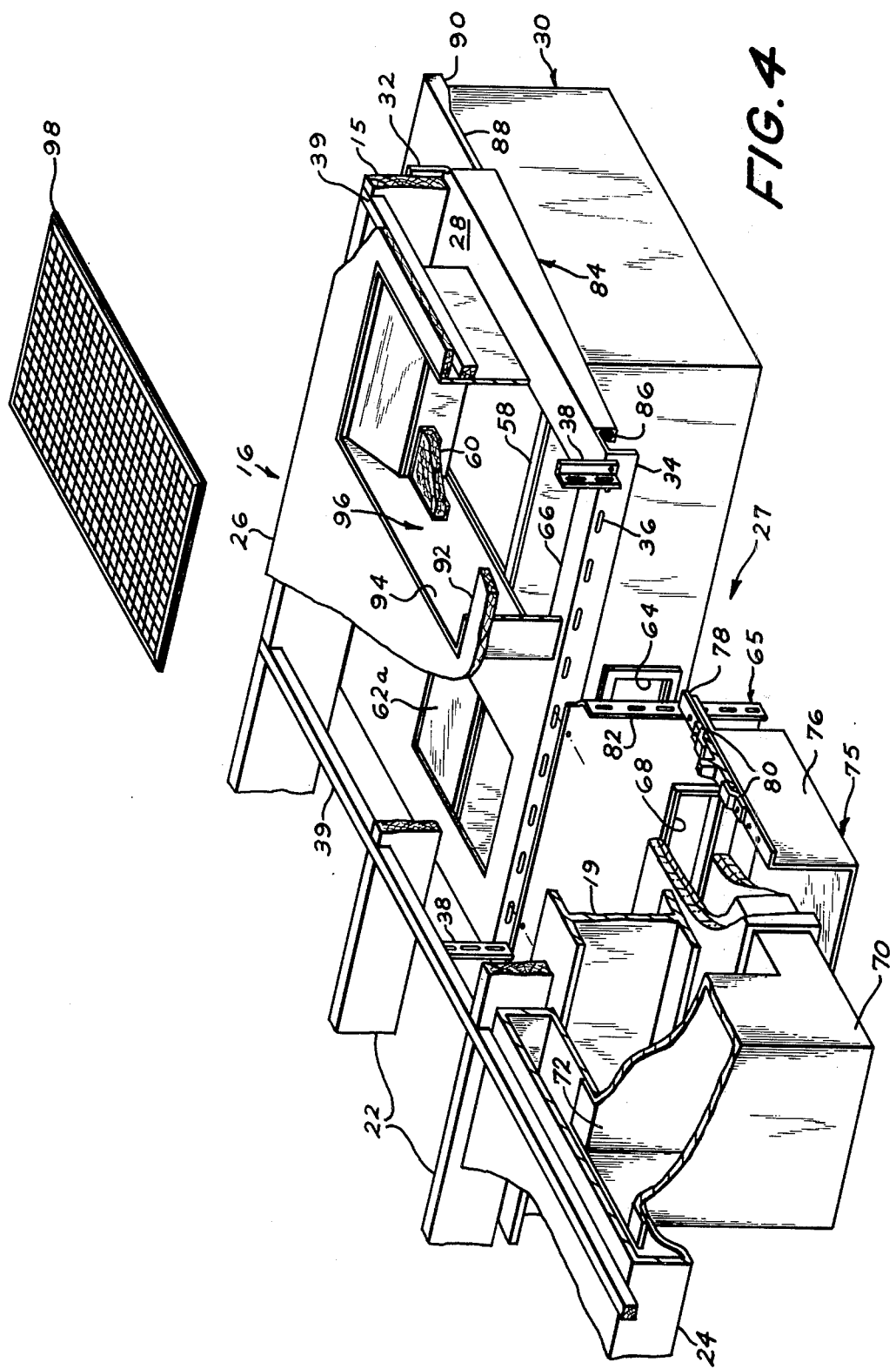

AIR CONDITIONING SYSTEM FOR A MOBILE HOME

FIELD OF THE INVENTION

The present invention relates to an air conditioning system to be used in a mobile home a more particularly to an air conditioning unit that is adapted to deliver air to the interior of the mobile home through its own built-in air distribution system. Provision is made during construction of the mobile home to accomodate a mounting or adaptor means that is located in the support structure of the mobile home and arranged to communicate with the air distribution system of the mobile home. When properly located in the mounting means, the air delivery outlet of the air conditioning unit is aligned to deliver air to the air distribution system of the mobile home.

The air conditioning unit when used is removably secured to the mounting means with its air outlet and inlet areas positioned to deliver air into the mobile home air distribution system.

DESCRIPTION OF THE PRIOR ART

Traditionally, air conditioning units when used in mobile homes require the use of cumbersome, flexible duct work to connect the unit into the air distribution system of the mobile home. In many installations, the exposed flexible duct work would be installed in a manner that would be considered unsightly but, more importantly, they are delicate and are therefore susceptible to physical damage.

U.S. Pat. No. 3,566,614-Imral provides a low-profile air conditioning unit that may be positioned under the mobile home. However, when the air conditioning unit, as taught in the above patent, is placed under the mobile home, the unit must then be connected into the mobile home air distribution system, which is an additional expense in both material and labor. Furthermore, the unit must still be connected by either the customary light-weight, delicate, flexible ducting or the more expensive rigid, sheet-metal ducting which when used would have to be fabricated and dimensioned for each installation requirements.

U.S. Pat. No. 3,712,078-Maynard provides a refrigeration unit including two covers, one solid and the other having a plurality of openings that are adapted to be used as inlet and outlet openings for circulating air from a removably mounted refrigeration unit into a refrigerator cabinet. The covers are dimensioned to be interchangeably secured to the bottom or top of the refrigeration unit, so that it may be positioned to supply refrigerated air upwardly when it is located in the bottom of the cabinet or downwardly when it is located above the cabinet.

U.S. Pat. No. 3,206,943-Rice et al shows a refrigeration unit arranged or adapted to be removably positioned in the bottom of a refrigerator cabinet. The refrigeration unit package is provided with rollers that cooperatively engage a track positioned on the cabinet wall that permits locating the refrigeration inlet and outlet openings into proper alignment with appropriate air distribution flues in the refrigerator cabinet.

While both of the above-mentioned U.S. Pat. Nos. 3,712,078 and 3,206,943 provide removably arranged refrigeration units relative to refrigeration cabinets, it should be noted, however, neither one teaches nor suggests the arrangement of the present invention as applied to the support structure of a mobile home. In the present invention, a mounting arrangement is provided that adapts an air conditioning unit to be installed in a mobile home support structure.

U.S. Pat. No. 2,525,869-Corhanidis discloses a refrigeration system that is removably mounted on a railroad car. The refrigeration unit is received in rails that are mounted on a frame that in turn is inserted into the floor of the chamber to be cooled. The frame has inlet and outlet ports formed therein. The chamber to be cooled may be provided with a conduit for receiving and distributing the cooled air. The above patent does not show nor teach the provision of a mounting means that can be used with a distribution system in a mobile home which may include a plurality of zones partitioned or isolated from each other. The use of the system disclosed in U.S. Pat. No. 2,525,869 in conjunction with a mobile home would require a frame for each zone to be air conditioned.

The construction of the mobile home support structures relative to the partitions separating the zones together with the various sizes of the zones would make the system disclosed in the above cited patents impractical.

The present invention provides an adaptor plate installed in the mobile home during its construction and, optionally, at some later or subsequent time, an air conditioning unit that is adapted to be removably received in the adapter means may be supplied and installed in the adaptor plate in alignment and cooperation with the air distribution system of the mobile home.

SUMMARY OF THE INVENTION

By this invention, there is provided an air conditioning system for use in a mobile home. The mobile home includes the customary support structure which carries the mobile home living quarters and an air distribution system providing an air inlet into the interior of the living quarters of the mobile home.

A mounting means including an adaptor plate is secured to the mobile home support structure. The mounting means is adapted to slidably receive an air conditioning unit at some later time. A plate attached to the adaptor plate is positioned adjacent the air delivery outlet and includes a first opening in alignment therewith. A second opening in the adaptor plate is in alignment with the air return outlet.

The mounting means further provides air communication means from the air conditioning unit air delivery outlet through the first opening to the mobile home air distribution system and for the air returning from the interior of the mobile home to the air conditioning unit air-return inlet through the second opening when the air conditioning unit is properly located in the plate.

It is therefore an object of the invention to provide a system for air conditioning a mobile home and the method of adapting the mobile home to removably receive a self-contained air conditioning unit.

BRIEF DESCRIPTION OF THE DRAWINGS

FIG. 4 is an exploded perspective view showing the mobile home base structure of FIGS. 2 and 3;

DESCRIPTION OF THE PREFERRED EMBODIMENT

Figure 1:
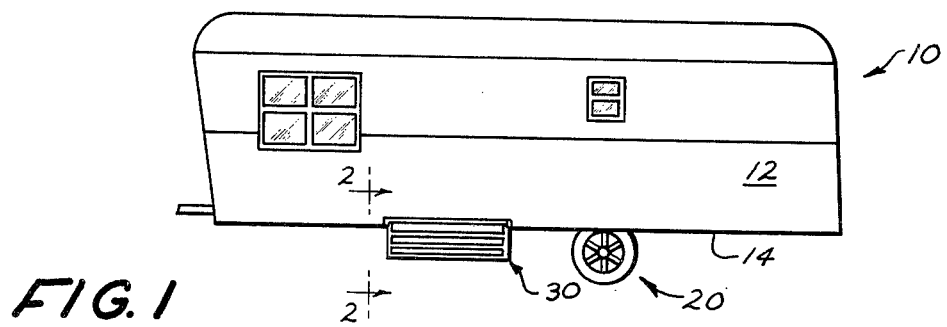
FIG. 1 is a side elevational view of a typical mobile home adapted with the present system.
Figure 2:
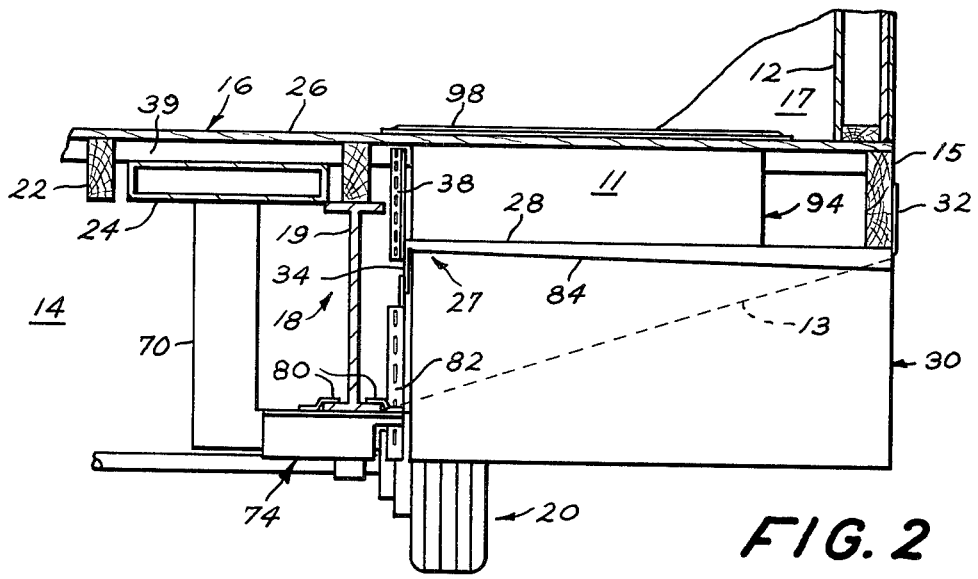
FIG. 2 is a partial sectional elevational view taken along lines 2—2 of FIG. 1.

Referring now to FIGS. 1 and 2 of the drawings, a mobile home 10 having side walls 12 is supported on a base structure 14. The base structure 14 includes a floor section 16 mounted on or carried on a support frame 18 which may be mounted on a wheel assembly 20 for transporting the mobile home from one location to another.

While the base structure 14 configurations may vary with manufacturers of mobile homes, one basic and accepted form used by manufacturers of mobile homes will herein be described in conjunction with the present invention. The support frame 18 includes parallel spaced main support I-beams or members 19 arranged longitudinally with respect to the mobile home 10. The beams 19 are spaced or located inwardly from the outer side walls 12 of the mobile home 10 to provide a support area 11 along both longitudinal side walls 12. In order to provide adequate support for the entire width of the mobile home 10 including the support area 11 between the beam 19 and side walls 12, side support or cantilever members 13 are spaced longitudinally and are secured to the beams 19. The side support members 13 project laterally outwardly so that the free ends are adjacent the outer edge of side walls 12 and support side beams 15 located directly under the outer walls 12.

Figure 3:
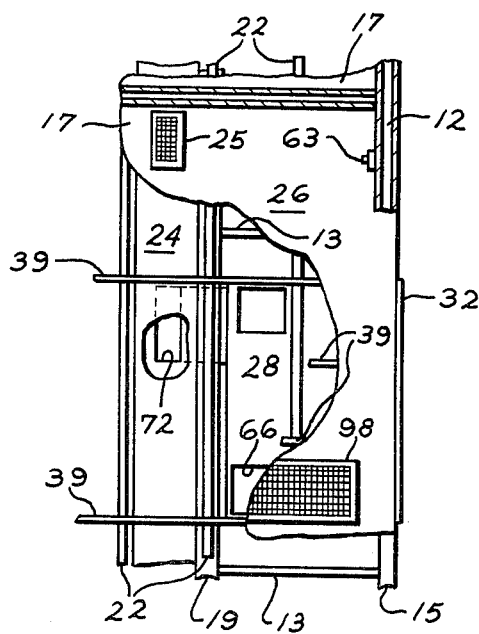
FIG. 3 is a partial plan view with parts broken away.

The floor section 16 includes floor support members or joists 22, as shown in FIGS. 2, 3 and 4, that are arranged parallel with the support beams 19 and side beam 15 in a spaced relationship across the width of the mobile home. The mobile home is customarily provided with a forced air heating furnace (not shown) which distributes heated air to the various rooms, or zones 17, to be heated through an air distribution system main duct 24. The duct 24 is arranged longitudinally extending usually substantially the full length of the mobile home, and may include air-delivery outlets 25 in each or selected ones of the zones 17 to be heated. In this arrangement, the air distribution system main duct 24 used in conjunction with the heating system of the mobile home 10 may be conveniently arranged between floor joists 22, that is between the floor 26 of the mobile home and the upper surface of the support member 19 or may be supported below them.

In accordance with the present invention, an air conditioning unit 30 (FIGS. 2, 4 and 5) is adapted to be used in conjunction with the mobile home air distribution system duct 24. To this end, aligning and mounting means 27 are provided in floor section 16. The aligning means 27 includes a mounting or adaptor plate 28 secured to the underside of the floor section 16 during the manufacture of the mobile home. The air conditioning unit 30 employed in the present system is capable of circulating conditioned air through the mobile home and is arranged to be removably received in the adaptor plate 28.

Figure 6:
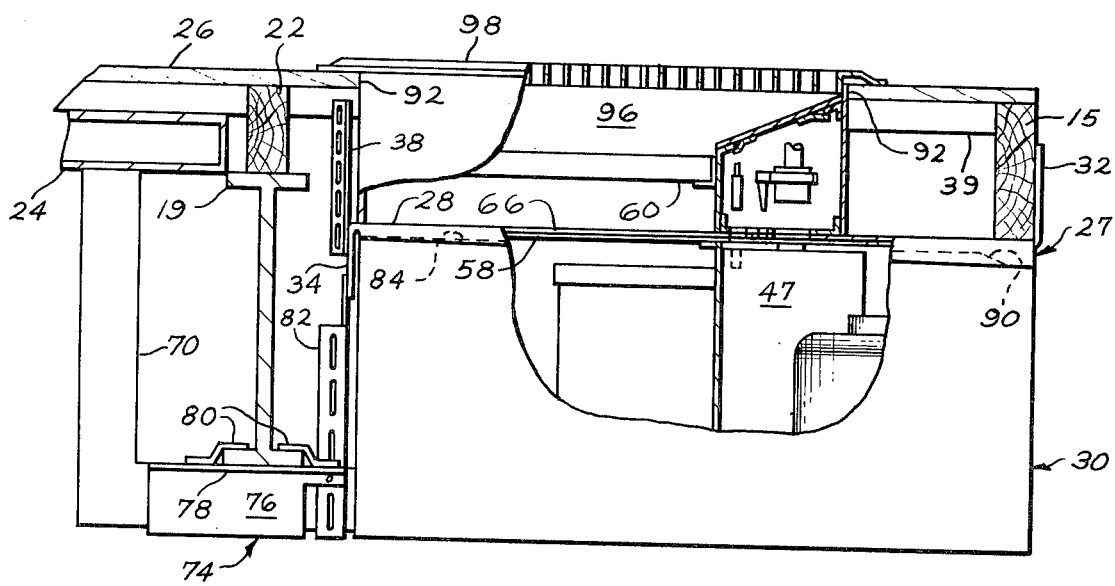
FIG. 6 is a sectional elevational view with parts broken away showing the air conditioner in its installed position.

The plate 28 is conveniently located in the support area 11, as shown in FIGS. 2 and 6, between member 13 in one or more locations in the mobile home, depending on the size of the mobile home, the number of zones to be conditioned, and the preference of size and capacity of the air conditioning unit.

The back or rear edge of the plate 28 (FIGS. 2, 3 and 6) is provided with an upwardly projecting flange 32 which is secured against the outer side of support beam 15 below wall 12 of the floor section 16. The front or forward edge of the adaptor plate 28 is provided with a downwardly extending flange 34 which includes a series of elongated slots or openings 36. Secured in the slots 36 are angle or support brackets 38 which have their other or upper ends secured to the cross member 39 fastened to the floor support joist 22. The brackets 38 are similarly provided with a plurality of holes which, together with the slots 36, allow a great degree of vertical and longitudinal flexibility of the forward end of plate 28 with respect to the spacing and dimensions of the joist 22.

Figure 5:
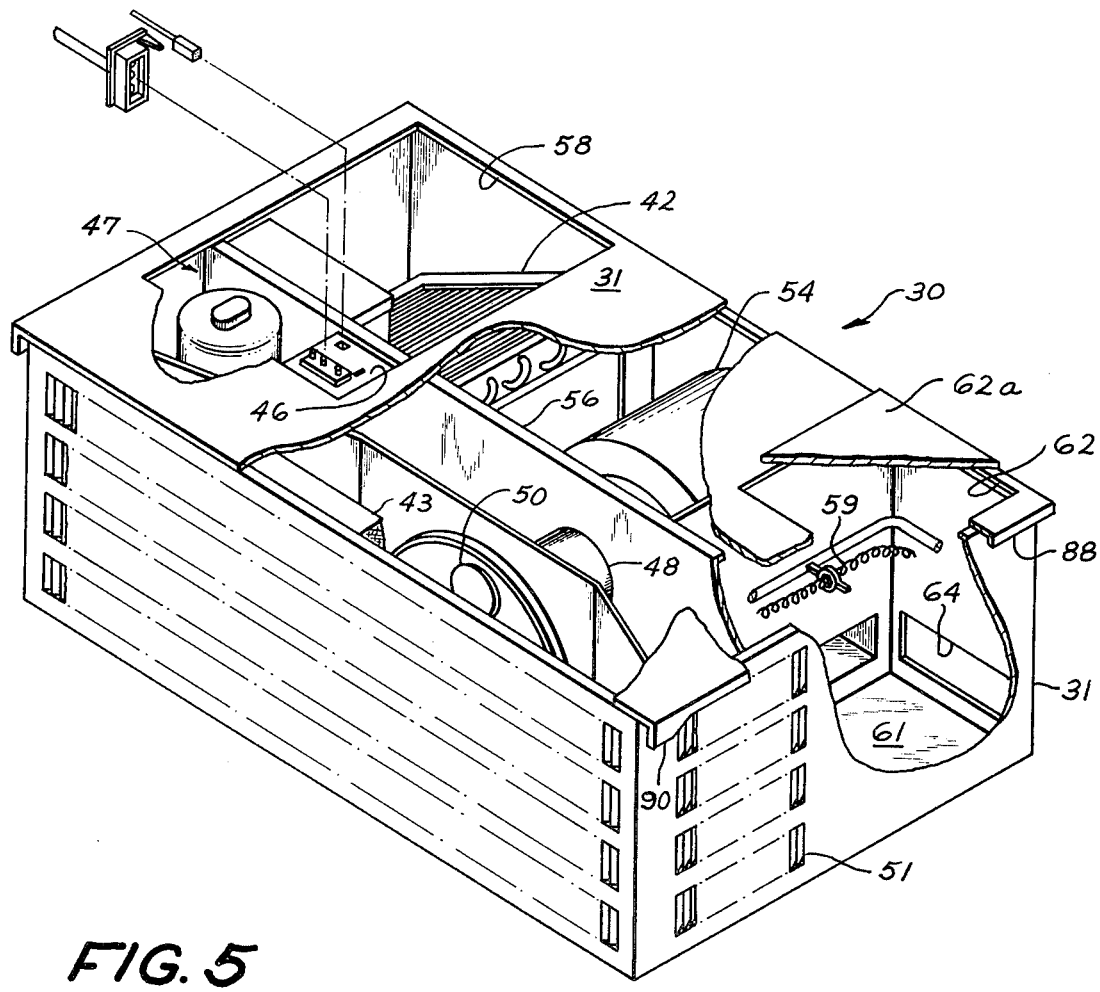
FIG. 5 is a perspective view of the air conditioning unit employed in the present system.

Referring now to FIG. 5, the air conditioning unit 30 to be used in conjunction with the mobile home 10 and its distribution system duct 24 is a self-contained unit arranged in a cabinet 31 and includes the customary refrigeration system having an evaporator section 42, condenser 43, compressor 44, power supply or control section 46, a motor 48 for driving fan 50 arranged in an opening in a barrier 52. The control section 46 and compressor 44 are located in a service area 47 provided between the barriers 52 and 56. The return inlet 58 as shown in FIG. 5 is dimensioned to extend beyond the barrier 56 to provide access to the service area 47. The fan 50 moves air in through an opening 51 in the side wall of the cabinet 31 and through the condenser 43 on the other side of the barrier 52 and out through louvers arranged in the rear wall of cabinet 31. The motor 48 is of the double-shaft type and also drives a blower 54 arranged in the other side of barrier 56 which is the main barrier dividing the cabinet 31 into the customary indoor-outdoor sections. The blower 54 draws air through a return inlet 58 arranged in the cover or upper wall of cabinet 31 through an appropriate filter 60, evaporator 42, and into a discharge chamber 61 which includes air discharge outlet 62 arranged in the upper wall and an outlet 64 arranged in the forward wall respectively of cabinet 31. The unit as used in conjunction with the present embodiment of the invention where the floor joists 22 are arranged longitudinally the outlet 62 is covered with a plate 62a and outlet 64 is used as will be described hereinafter. It should be noted however that outlet 64 may be located on any side wall of cabinet 31, including the bottom wall, that communicates with chamber 61.

The air conditioning unit 30 used in conjunction with the present embodiment of the present invention may be of the type that provides both cooling and heating, in which event the mobile home heating furnace may not be installed or used. In order to supply heated air to the mobile home the air conditioning unit may be of the reverse cycle, heat pump type or alternately as shown in FIG. 5 a resistance heater 59 may be arranged in the path of discharge air in the chamber 61. It should be understood that when the air conditioning unit provides both cooling and heating, a heating furnace may not be supplied and the air distribution duct 24 may be segmented depending on the number of air conditioning units used and the number or locations of the zones. As will be hereinafter explained in detail, the air conditioning unit 30 is controlled by a temperature responsive thermostat means 63 arranged conveniently in one or more of the mobile home zones 17.

The mounting means 27 and more specifically the adaptor plate 28, used in the floor section construction shown in the drawings is provided with an air-return opening 66 arranged, as will be hereinafter explained, to communicate with the interior of the mobile homes, and a barrier or plate 65 which has an air outlet 68 positioned therein. It will be noted that the opening 66, as will be hereinafter explained in detail, aligns with opening 58 while opening 68 aligns with outlet 64 when the air conditioning unit is fully located in the adaptor plate 28.

The aligning means 27, and more specifically the adaptor plate 28, employed in the floor construction of the mobile home 10 shown in the drawings, further provides means for connecting the air outlet 64 of the air conditioner unit 30 into communication with the air distribution duct 24. Accordingly the air communication means from the air conditioner air delivery outlet 64 to the air distribution system duct 24 is arranged to extend across the bottom of support member 19.

To this end, the aligning means 27 provides the barrier or plate 65 which includes the opening 68 adjustably secured to the flange 34. The plate 65 is secured to the forward edge of plate 28 and extends downwardly so that the opening 68 is located below the lower distal edge of beam 19. The opening 68 is adjusted into horizontal alignment with opening 64 by positioning the plate 65 in the slots 36 of flange 34.

Further, in this type mobile home construction, communication between the air conditioning unit 30 and duct 24 is effected by an air conduit means 70. The conduit 70 extends from the opening 68 across the bottom distal edge of beam 19 and then upwardly to an opening 72 in the mobile home air distribution duct 24. Alternatively as mentioned hereinbefore, the opening 64 in the cabinet 31 may be located in the side wall and the plate 65 arranged adjacent the side wall with duct 70 extending across the bottom of beam 19 as hereinbefore described. It should be noted that in the event opening 64 is not arranged below the beam 19, duct 70 may be shaped to extend around beam 19.

Means are provided to support and position the duct 70 on the beam 19 so that duct 70 is axially aligned with opening 68 on the plate 65. Accordingly, the duct 70 rests and is supported on the bottom wall portion of a U-shaped sleeve member 74. The upper ends of the side wall portions 76 of the sleeve 74 are provided with outwardly projecting flanges 78. The sleeve 74 is secured to the beam 19 by a pair of clamps 80 that are secured to each of the flanges 78 and are appropriately shaped to engage the lower oppositely projecting leg portion of the I-beam 19. This clamping arrangement provides longitudinal adjustment along the I-beam 19 while the placement of the clamps 80 in appropriate holes arranged in the flanges 78 provides horizontal axial adjustment relative to opening 68. The sleeve 74 is secured in appropriately selected openings in a vertically arranged flange 82 formed in the plate 65 to support the aligned conduit 70 between the bottom wall of sleeve member 74 and the beam 19. As can be readily understood the conduit 70 provides a means for aligning the opening 68 in plate 65 of the aligning means and more specifically the air conditioning air outlet 64 with the distribution system duct 24.

To properly insure the intimate alignment of the openings 58 with 66 and opening 64 with 68, the adaptor plate 28 is provided with a depending track or support means 84 projecting downwardly along the parallel side walls of the plate 28. The track 84 is provided with a raceway 86 formed to receive a guide member 88 (FIGS. 4 and 5) projecting from the upper side edges of the upper wall of the air conditioning unit cabinet 31. The raceway 86 is formed so that it inclines upwardly from the flange 32 end of the plate 28. The guide member 88 has a downwardly projecting cam member 90 formed on its trailing edge.

In operation, that is during the insertion of the air conditioning unit guide member 88 into the raceway 86 of the adaptor plate 28, the leading or forward edge of the guide member 88 rides upwardly in the raceway 86 toward the underside of the plate 28 with the cam member 90 engaging the open rear end of the raceway 86 just prior to the complete insertion of the air conditioning unit 30. During the last portion of the insertion process, the cam member 90 causes the rear or trailing end of the air conditioner to be raised as it is completely inserted into the raceway 86 so that the top wall of the cabinet 31 is parallel to and against the plate 28 with the appropriate openings 58, 66 and 64, 68 engaged in a sealed air transfer position.

In order for the blower 54 to draw air from the interior of the mobile home, means are provided to connect air-return openings 58 and 66 with an opening 92 in the floor 26 of the mobile home. Accordingly, as seen in FIGS. 4 and 6, the air-return openings 66 and 58 are aligned by a suitable ducting 94 which defines an air-return passageway or opening 96 in the floor section 16. The opening 92 may be provided with an appropriate removably arranged grille 98. The vertical flexibility of plate 28 afforded by the flange 32 and brackets 38 permits the use of a duct, 94 having a standard axial dimension. This is especially important in that floor joist dimensions may vary according to manufacturers. It would not be practical in all instances to secure the plate 28 directly to the floor joist since the axial dimension of the duct would then have to be fabricated to match the joint dimension. By employing the arrangement of the present embodiment the duct 94 and passageway 96 may be secured to and be an integral part of the plate 28. The plate 28 including duct 94 can then be suspended at its forward end by vertically positioning the brackets 38 on cross member 39 and at its rear end by vertically positioning the flange 32 on beam 15 so that the upper peripheral edge of duct 94 is adjacent the floor 16.

In summary it should be apparent from the foregoing description that an air conditioning system and method are provided for air conditioning a mobile home that includes installing a mounting means during construction of the mobile home for adapting the mobile home to removably receive a self-contained air conditioning unit. The mounting means further includes air communication means for connecting the air conditioner in air communication with the distribution system duct of the mobile home.

While there has been shown and described a specific embodiment of the invention, it will be understood that it is not limited thereto and it is intended by the appended claims to cover all such modifications as fall within the true spirit and scope of the invention.

What is claimed is:

1. An air conditioning system including a mobile home having at least one zone to be air conditioned and a base structure, having longitudinally extending spaced parallel support beams being located inwardly of the outer walls of said mobile home for providing a support area therebetween, said distribution means being located between said support beams, said system comprising:

an air conditioning unit including a cabinet being adapted to be removably attached to said mobile home, said cabinet including air moving means, air delivery outlet one one of said cabinet side walls and an air return outlet in the top wall of said cabinet;

said air distribution means including at least one air inlet for receiving air from said air conditioning unit and an air outlet for delivering air into said mobile home zone;

mounting means including an adaptor plate attached to said base structure in said support area for removably receiving said air conditioning unit, a plate attached to said adaptor plate being positioned adjacent said air delivery outlet including a first opening in alignment with said air delivery outlet and, a second opening in said adaptor plate in alignment with said air return outlet when said unit is located in said mounting means;

air communicating means including a first passageway extending from said first opening across the lower distal end of said support beam to said air distribution means air inlet, and a second passageway for connecting said second opening with said mobile home zone so that said air moving means recirculates air through said mobile home.

2. The air conditioning system according to claim 1 wherein said air conditioning air delivery outlet is arranged in the front wall of said air conditioner cabinet, and said plate is attached to the forward edge of said adaptor plate.

3. The air conditioniong system according to claim 2 wherein said support beam includes a horizontally disposed leg portion at its lower distal end;

a U-shaped support member including outwardly extending flange portions along the longitudinally disposed upper free ends of the side walls of said U-shaped support member;

clamp means on said flange portion engaging the free ends of said horizontal disposed leg portion of said support beam for securing said U-shaped support member on said support beam so that said first passageway is arranged in said U-shaped member and adjacent said support member.

4. The air conditioning system according to claim 1 wherein said U-shaped support member is secured to said plate to prevent movement of said plate relative to said support beam.

* * * * *